(12) United States Patent
Hwang et al.

(10) Patent No.: US 7,062,699 B2
(45) Date of Patent: *Jun. 13, 2006

(54) METHOD AND APPARATUS FOR RECORDING DATA ON RECORDING MEDIUM AND RECORDING MEDIUM INCLUDING RECORDED DATA

(75) Inventors: Sung-hee Hwang, Seoul (KR); Yoon-woo Lee, Suwon-si (KR); Sung-hyu Han, Seoul (KR); Sang-hyun Ryu, Suwon-si (KR); Young-im Ju, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

This patent is subject to a terminal disclaimer.

(21) Appl. No.: 10/320,739

(22) Filed: Dec. 17, 2002

(65) Prior Publication Data

US 2003/0131309 A1   Jul. 10, 2003

(30) Foreign Application Priority Data

Dec. 17, 2001   (KR) .............................. 2001-80014

(51) Int. Cl.
*G11B 7/07* (2006.01)
*H03M 13/05* (2006.01)

(52) U.S. Cl. ................ 714/756; 369/59.23; 369/59.24; 369/124.08; 714/784; 714/804

(58) Field of Classification Search ............. 369/59.23, 369/59.24, 124.08; 714/756, 784, 804; G11B 7/07
See application file for complete search history.

(56) References Cited

U.S. PATENT DOCUMENTS 6,281,815 B1    8/2001  Shim et al.
2003/0133385 A1*  7/2003  Lee et al. ............... 369/59.24

FOREIGN PATENT DOCUMENTS

| JP | 9-293331 | 11/1997 |
| JP | 2001-23177 | 1/2001 |
| JP | 2001-101806 | 4/2001 |
| JP | 2002-319247 | 10/2002 |
| KR | 2002072679 A * | 9/2002 |

OTHER PUBLICATIONS

Hsie-Chia Chang; Shung, C.B.; Chen-Yi Lee; A Reed-Solomon product-code (RS-PC) decoder chip for DVD applications; Solid-State Circuits, IEEE Journal of vol. 36, Issue 2, Feb. 2001 pp. 229-238.*

* cited by examiner

*Primary Examiner*—R. Stephen Dildine
(74) *Attorney, Agent, or Firm*—Stein, McEwen & Bui, LLP

(57) ABSTRACT

Provided is a method of recording data on an optical recording medium having a plurality of addressable unit areas. 62 sync frames, each having a sync code and data, can be recorded in each of the addressable unit areas. Thus, user data can be recorded on a recordable optical disc at a higher density.

20 Claims, 11 Drawing Sheets

METHOD AND APPARATUS FOR RECORDING DATA ON RECORDING MEDIUM AND RECORDING MEDIUM INCLUDING RECORDED DATA

CROSS-REFERENCE TO RELATED APPLICATIONS

This application is based upon and claims the benefit of Korean Application No. 01-80014, filed Dec. 17, 2001 in the Korean Intellectual Property Office, the contents of which is incorporated herein by reference.

BACKGROUND OF THE INVENTION

1. Field of the Invention

The present invention relates to a method and an apparatus for recording data on a recordable disc, and more particularly, to a method and an apparatus for recording data on a recordable compact disc at a high density, and a recordable medium including such recorded data.

2. Description of the Related Art

Recently, as large capacity video and audio data are frequently transmitted and received over the Internet, the need for a high-density recording medium capable of easily recording/reproducing data thereon/therefrom has arisen.

Recordable optical discs typically include CD-R/RWs of 650 MB, DVD-RAM/R/RWs of 4.7 GB, DVD+RWs of 4.7 GB, and the like. Also, development is progressing for HD-DVDs with recording capacities of more than 20 GB.

In the case of DVDs, DVD-ROMs are gradually becoming widespread among the general public, whereas D-RAM/R/RWs, DVD+RWs, and recording apparatuses capable of recording user data on D-RAM/R/RWs and DVD+RWs are not so widely accepted. Thus, even though they have a lower capacity of only about 650 MB, CD-R/RWs have become widely used as recordable optical discs. While data can be repeatedly rewritten on CD-RWs, data can be recorded only one time on CD-Rs.

SUMMARY OF THE INVENTION

To solve at least the above-described problems, it is an object of the present invention to provide a method and an apparatus for recording data on a conventional recordable disc at a high density, and a conventional recordable disc including such recorded data.

Additional objects and advantages of the invention will be set forth in part in the description which follows and, in part, will be obvious from the description, or may be learned by practice of the invention.

It is another object of the present invention to provide a method and an apparatus for recording data on a recordable compact disc at a higher density.

To achieve the above and other objects, an aspect of the present invention provides a method of recording data on an optical recording medium with a plurality of addressable unit areas. The method may include recording 62 sync frames, each having a sync code and data, in each of the addressable unit areas.

An additional aspect of the present invention provides a method of recording data on a compact disc having a plurality of physical sector areas, with the physical sector areas being designated by addressing information pre-recorded during the manufacture of the compact disc. The method may include recording two physical sectors in each of the physical sector areas.

The recording of the two physical sectors may include recording 62 sync frames, each having a sync code and data of 77 bytes.

The recording of the two physical sectors may include: adding an error detecting code to user data and header information; performing error correction code-encoding; performing interleaving; performing channel-modulating; adding a sync code to a channel bit stream corresponding to data of 77 bytes to generate one sync frame; and recording 62 sync frames in each physical sector area.

The performing of error correction may further include the generation of an error correction code block to which main data of 148×112 bytes, Parity Inner with 6 bytes, and Parity Out with 12 rows are added, using Reed-Solomon Product Code.

The performing of interleaving may further include: dividing two error correction code blocks of N1×N2 bytes into blocks of "d" bytes that represent the greatest common divisor along a column, respectively; dividing the object blocks of d×N1 bytes into d parts along a row and a column, respectively, to obtain partitions of d×d; and interleaving data in a predetermined partition by alternatively selecting the two error correction code blocks to obtain a recording block having line-code words of 2×N2.

The performing of interleaving may also include the generation of a recording block having 16 recording units by performing interleaving, with the recording unit having a size of 154×15.5 bytes and include Parity Out with 1.5 rows.

The channel-modulating may include performing channel-modulation of data of 1 byte to 15.3 channel bits. The adding of the sync code to a channel bit stream also may be performed according to a Dual modulation algorithm.

To achieve the above and other objects, an aspect of the present invention provides an apparatus for recording data on a compact disc having a plurality of physical sector areas, with the physical sector areas being designated by addressing information pre-recorded during the manufacture of the compact disc. The apparatus may include an encoding unit, a modulating unit, a sync unit, and a recording unit. The encoding unit encodes user data and header information, the modulating unit modulates the encoded data to channel bits, the sync unit adds a sync code to the modulated data, and the recording unit records 62 sync frames, each having a sync code and data, in an addressable unit area.

The encoding unit may include an error detecting code adder, an error correction code encoder, and an interleaver. The error detecting code adder adds an error detecting code to the user data and the header information. The error correction code encoder error correction code-encodes the user data and the header information, to which the error detecting code is added, using Reed-Solomon Code to generate an error correction code block. The interleaver interleaves the generated error correction code block.

The error detecting code adder may generate a logic sector of 148×14 bytes having user data of 2048 bytes, header information, and an error detecting code, and the error correction code encoder may generate an error correction code block of 154×124 bytes, in which Parity Inner with 6 bytes and Parity Out with 12 rows are added to eight logic sectors, using Reed-Solomon Product Code.

The interleaver may divide first and second error correction code blocks into two parts along rows of the error correction code blocks and divide two rows along a column of the error detecting code blocks, respectively, to form 56 object blocks, each including four partitions. The interleaver may then interleave data so that partitions of the object blocks belonging to the first error correction code block and partitions of the object blocks belonging to the second error correction code block are alternatively selected to generate a recording block The sync unit may generate one physical sector which includes 31 sync frames, each having a channel bit stream corresponding to data of 77 bytes and a sync code of 32 channel bits.

To achieve the above and other objects, an aspect of the present invention provides a recordable medium including recorded data having a plurality of physical sector areas, with the physical sector areas being designated by addressing information pre-recorded during a manufacture of the recordable medium. The recording medium may include recorded data that is recorded according to an encoding of user data, an interleaving of the encoded data, a modulating of the interleaved data, and a synchronizing of the modulated data.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1A:
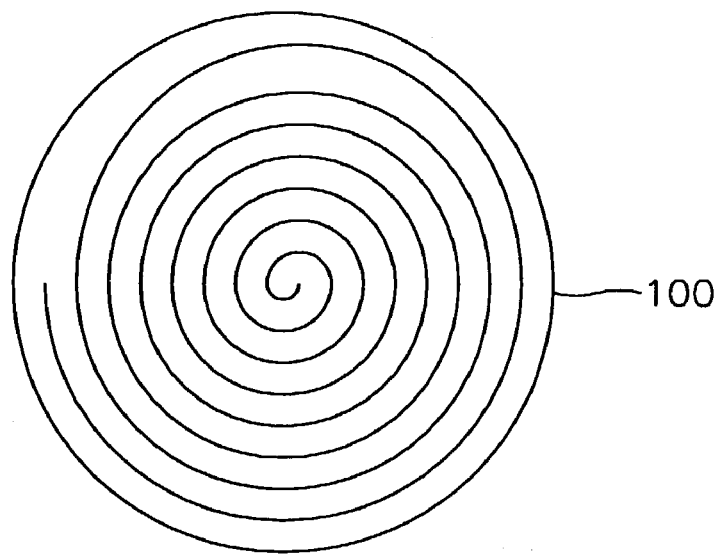
FIGS. 1A and 1B are schematic illustrations of a conventional compact disc.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
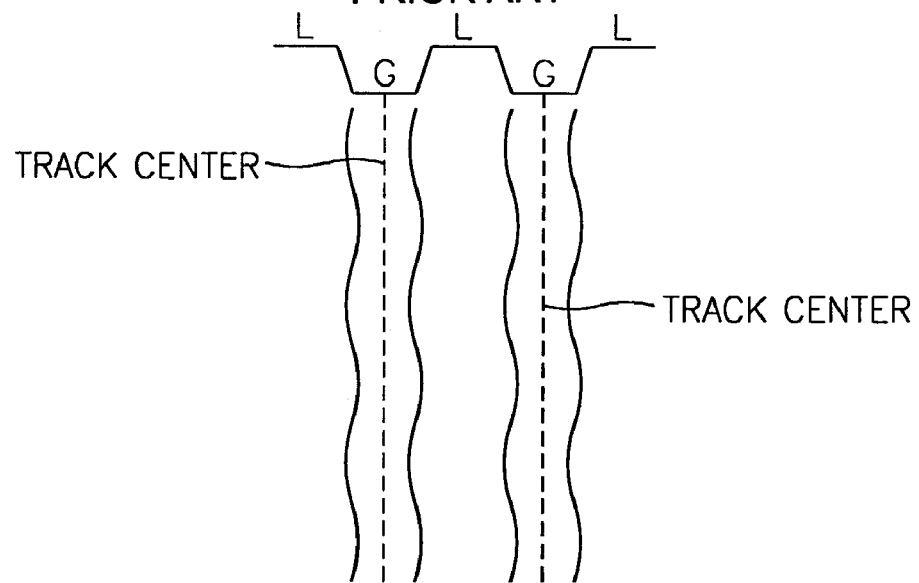

FIGS. 1A and 1B are schematic views of a recording medium, e.g., a recordable compact disc. Referring to FIG. 1A, a spiral track is formed in a recordable compact disc 100. The track includes land tracks and groove tracks. Referring to FIG. 1B, reference characters G and L represent groove tracks and land tracks, respectively. The groove tracks are wobbled by about ±0.03 μm toward the radius direction of the recordable compact disc 100. Signals detected from the wobbled tracks through a push-pull channel are called "wobble signals." A wobble signal includes absolute time information on a disc, i.e., Absolute Time In Pregroove (ATIP) information, a frequency of which is modulated. The ATIP information is a type of address information. Thus, a physical sector area can be determined based on the ATIP information. According to a conventional recording format, user data of 2048 bytes ("a physical sector") is recorded in one physical sector "area", i.e., "an ATIP sector." Conversely, according to embodiments of the present invention, user data of 4096 bytes (two physical sectors) can be recorded in one physical sector "area."

Figure 2:
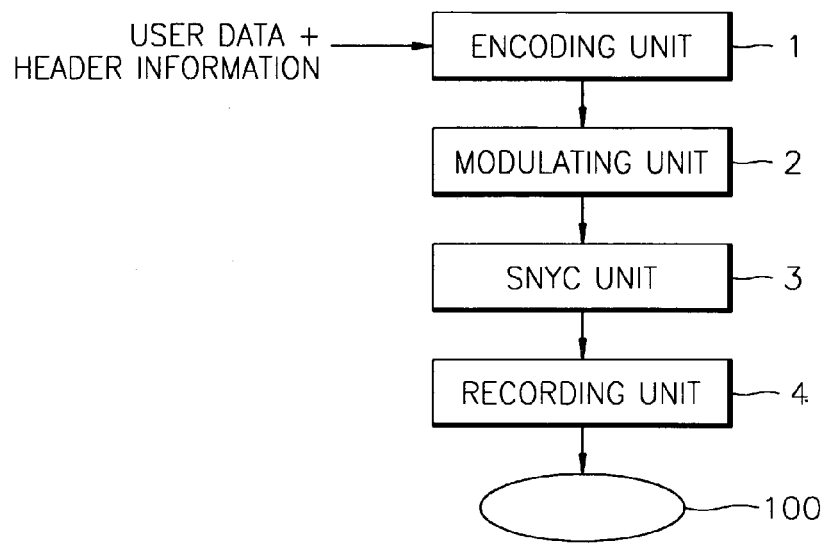
FIG. 2 is a block diagram of a recording apparatus according to an embodiment of the present invention.

FIG. 2 is a block diagram of a recording apparatus according to an embodiment of the present invention. Referring to FIG. 2, the recording apparatus records data on the compact disc 100 shown in FIGS. 1A and 1B and includes an encoding unit 1, a modulating unit 2, a sync unit 3, and a recording unit 4.

The encoding unit 1 encodes user data and header information. The modulating unit 2 modulates the encoded data to a channel bit stream. The sync unit 3 adds a sync code of a predetermined channel bit to a predetermined position of the modulated channel bit stream. The recording unit 4 records the channel bit stream, including the sync code, on the compact disc 100. According to embodiments of the present invention, two physical sectors, i.e., 62 sync frames, can be recorded in one physical sector area. One sync frame comprises sync codes of a predetermined channel bit and data of 77 bytes.

Figure 3:
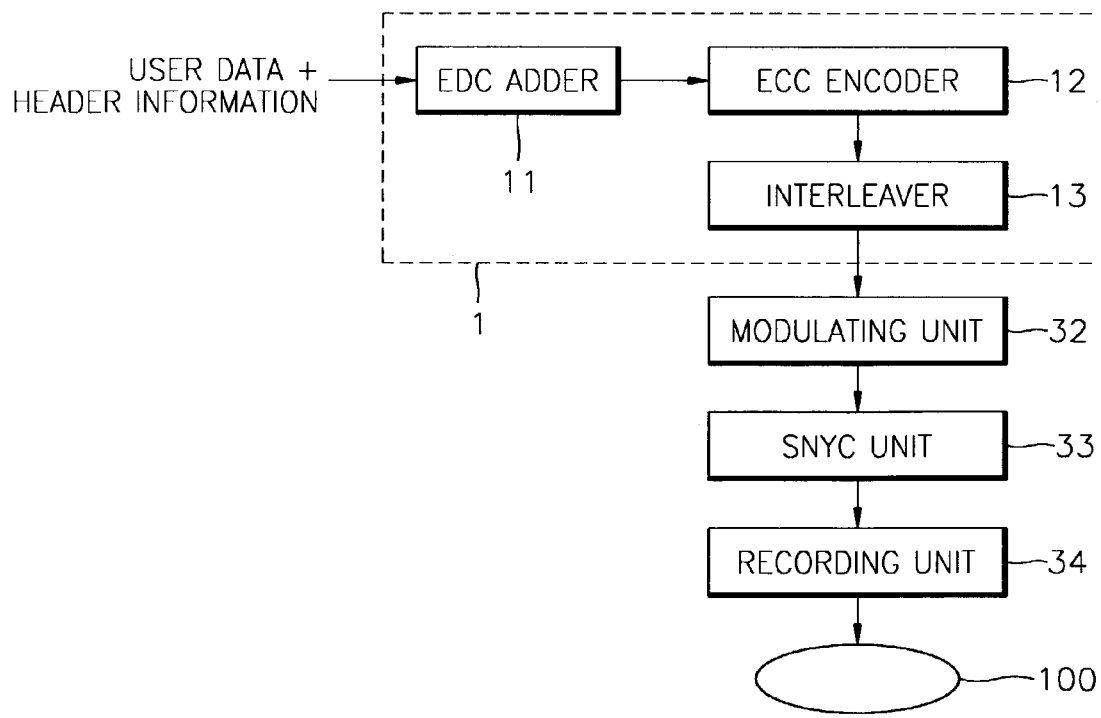
FIG. 3 is a block diagram of another recording apparatus, based on the recording apparatus shown in FIG. 2, according to another embodiment of the present invention.

FIG. 3 is a block diagram of another recording apparatus, based on the recording apparatus design shown in FIG. 2. The recording apparatus illustrated in FIG. 3 includes an error detecting code (EDC) adder 11, an error correction code (ECC) encoder 12, an interleaver 13, a modulating unit 32, a sync unit 33, and a recording unit 34.

The EDC adder 11 adds an EDC to user data and header information to generate a logic sector. The ECC encoder 12 generates an ECC block in which parity, i.e., Parity Inner (PI) and Parity Out (PO) are added to a plurality of logic sectors by performing ECC-encoding using Reed-Solomon Product Code. Reed-Solomon Product Code is used for correcting multi-errors. However, codes may vary as necessary. The size of the ECC block and the number of bytes which are assigned to Pi and PO may also vary.

The interleaver 13 interleaves two ECC blocks to generate a recording block. The interleaver 13 divides first and second ECC blocks into two parts along rows of the ECC blocks and divides two rows along a column of the ECC blocks, respectively, to form 56 object blocks each including four partitions and interleaves data so that partitions of the object blocks belonging to the first ECC block and partitions of the object blocks belonging to the second ECC block are alternatively selected to generate a recording block. More detailed descriptions will be described later.

The modulating unit 32 modulates data of 1 byte to 15.3 channel bits according to a Dual modulation algorithm. The sync unit 33 adds a sync code of 32 channel bits according to the Dual modulation algorithm to a channel bit stream. The Dual modulation algorithm is disclosed in U.S. Pat. No. 6,281,815 issued to Shim et al. on Aug. 28, 2001, which corresponds to Korean Patent Application No. 1999-42032 entitled "Method of Arranging RLL Codes Having Improved DC Suppression Capabilities, Demodulation and Modulation algorithm, and Demodulating Apparatus," filed on Sep. 30, 1999 by the applicant of the present invention and published on Nov. 25, 2000. In brief, in the Dual modulation algorithm, first, a pair of code groups is arranged such that DC suppression of a code sequence can be controlled; second, signs of a parameter CSV, representing a DC value in a code word of a code corresponding to the same source code in the pair of code groups, and codes (1, 8, 8, 12), arranged so that characteristics of a parameter INV for estimating a Digital Sum Value (DSV) transition direction of a next code word are opposite to one another, are used.

The recording unit 34 records two physical sectors in one ATIP sector according to the present invention. One physical sector according to the present invention includes 31 sync frames. As will be described later, one sync frame comprises a sync code of 32 channel bits and data of 77 bytes. The detailed structure of one physical sector will be described later.

Figure 4:
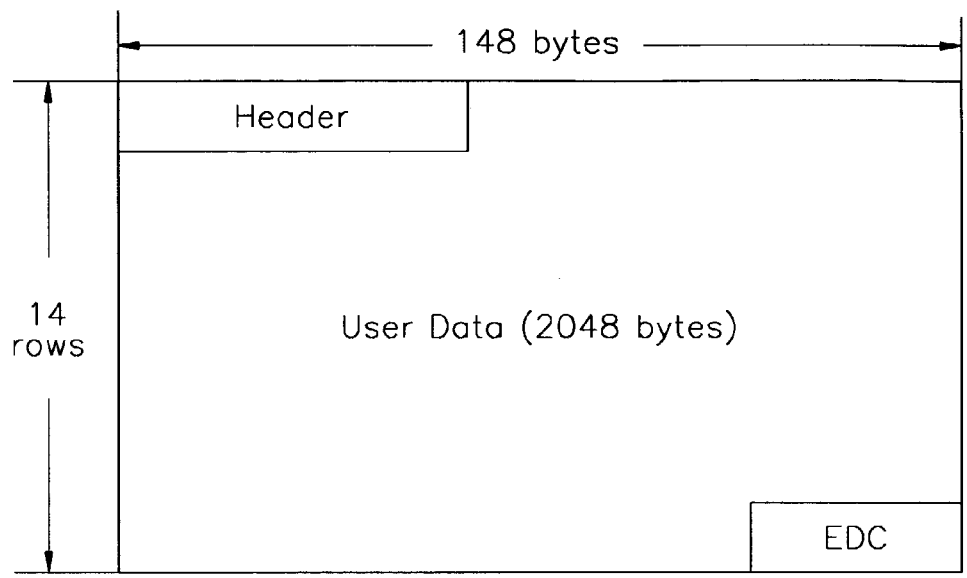
FIG. 4 is an illustration of a configuration of a logic sector according to an embodiment of the present invention.

FIG. 4 shows the configuration of one logic sector. Referring to FIG. 4, one logic sector generated by the ECC adder 11 has the size of 148×14 bytes according to the embodiment of the present invention and comprises user data of 2048 bytes, header information of 20 bytes, and an EDC of 4 bytes.

Figure 5:
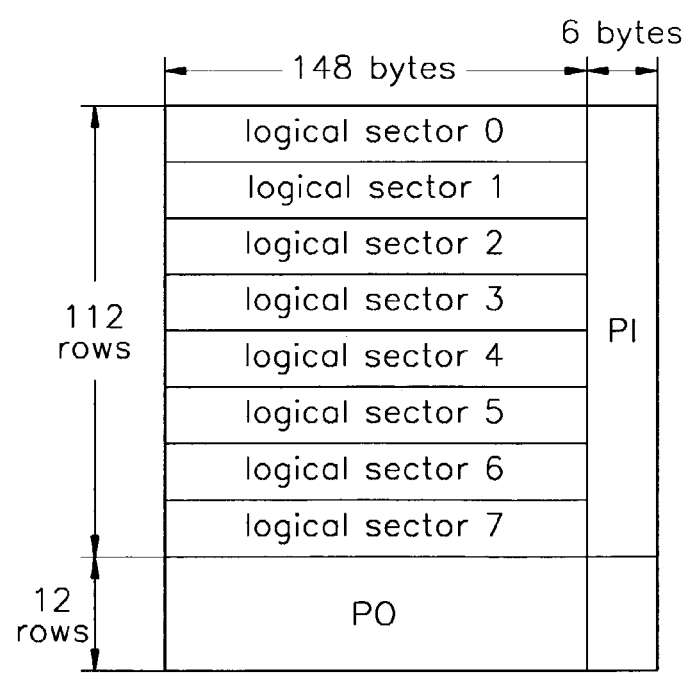
FIGS. 5 and 6 are illustrations of different configurations of an ECC block according to embodiments of the present invention.
Figure 6:
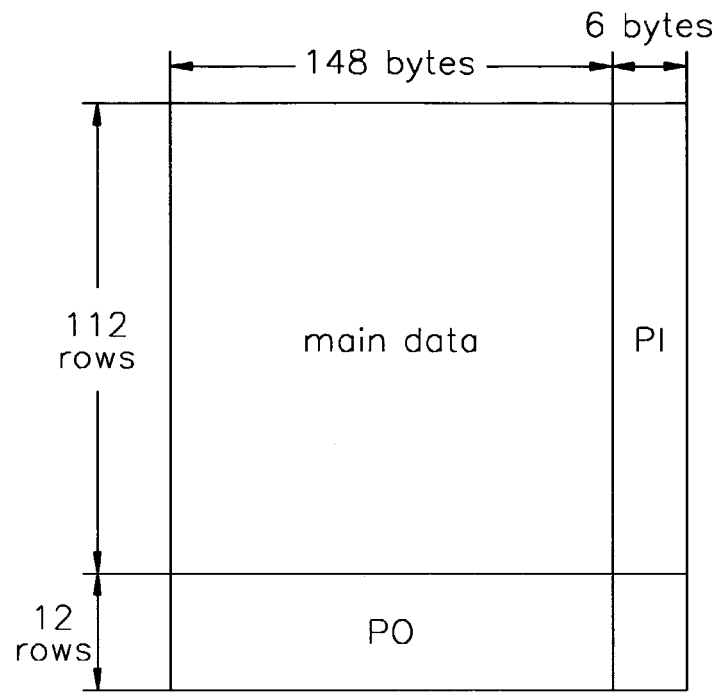
Figure 6:
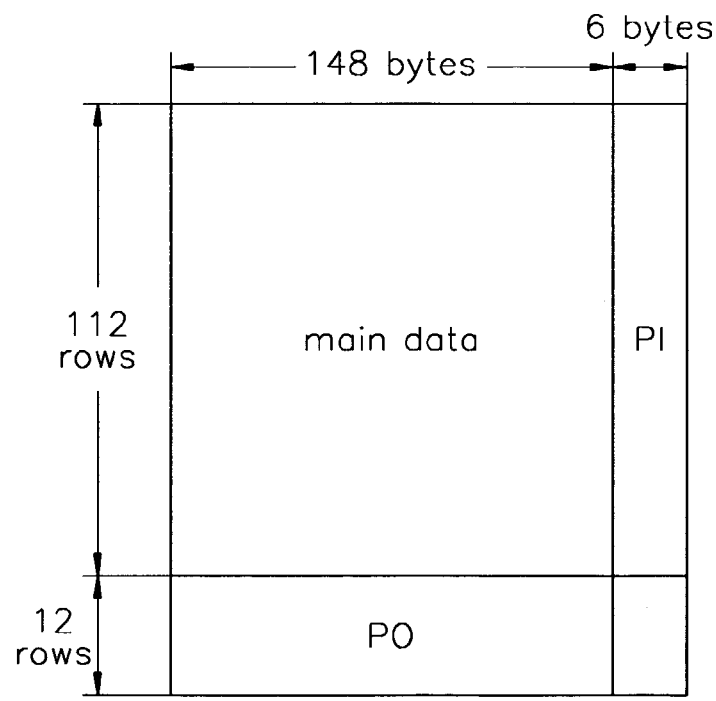

FIGS. 5 and 6 show the configurations of an ECC block. Referring to FIG. 5, the ECC encoder 12 generates the ECC block of 154×124 bytes by adding PI and PO to eight logic sectors which was described with reference to FIG. 4. A code word of data of 148 bytes and PI of 6 bytes are arranged along a row and code words of 112 rows are arranged along a column with PO of 12 rows.

Referring to FIG. 6, the interleaving according to the present invention is performed in ECC blocks A and B. Data except PI and PO is called "main data."

Figure 7:
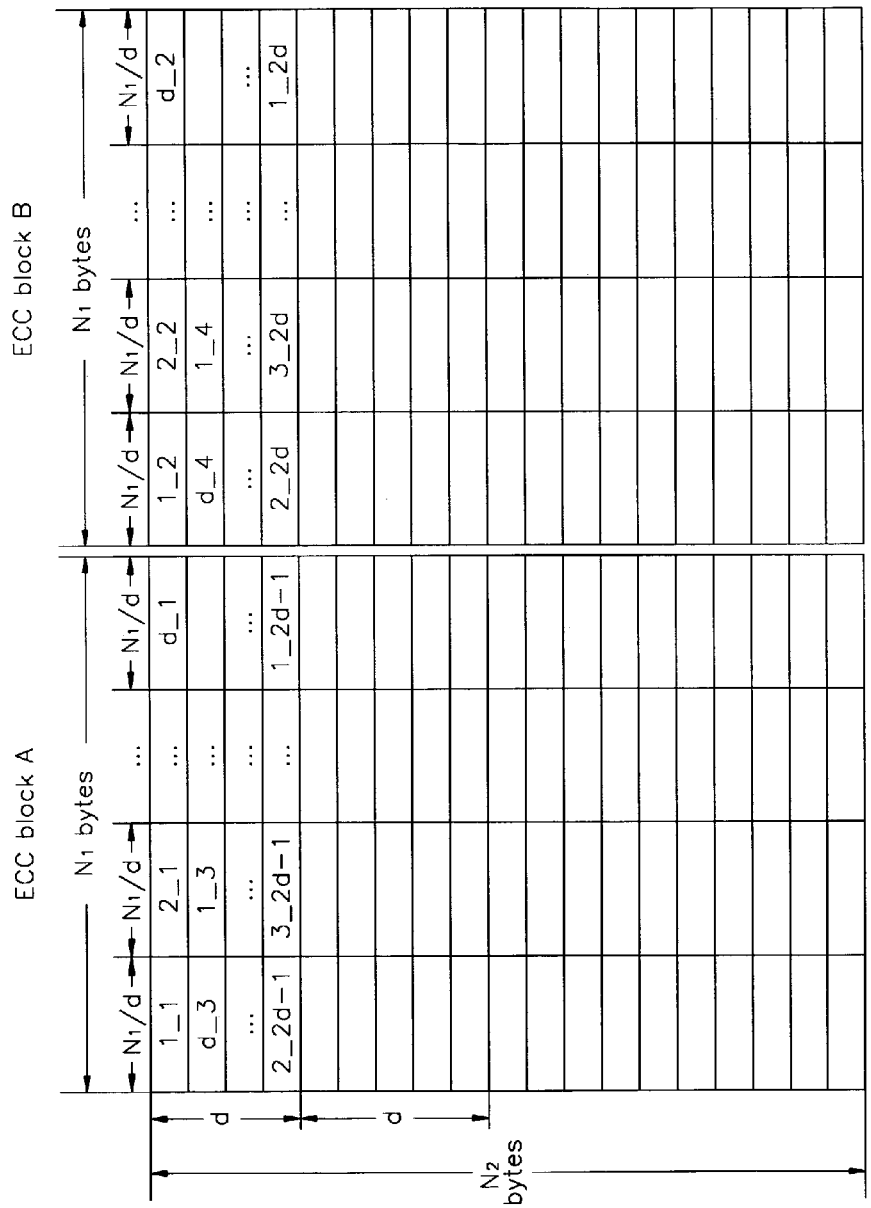
FIGS. 7 through 11 are illustrations explaining an interleaving operation according to an embodiment of the present invention.
Figure 8:
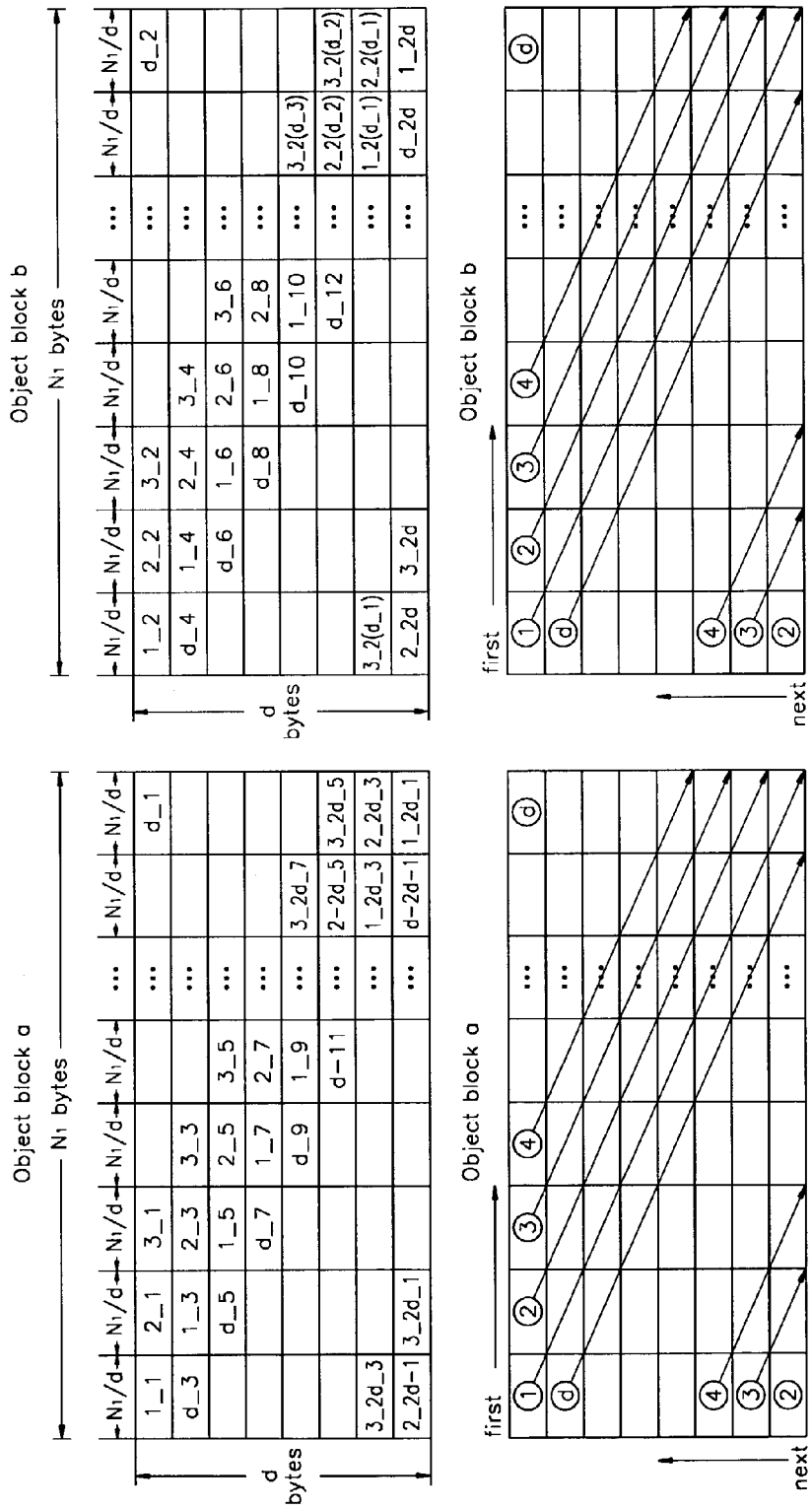

FIGS. 7 to 11 are reference views for explaining interleaving according to the present invention. Referring to FIGS. 7 and 8, assuming that ECC blocks A and B are composed of data of $N_1$ bytes along the row and data of $N_2$ bytes along the column, respectively, the interleaving is performed as follows.

First, ECC blocks A and B are divided into "d" blocks along a column. Here, "d" is a common divisor of $N_1$ and $N_2$. The divided several blocks are called "object blocks." The interleaving according to this embodiment is performed in the respective object blocks "a" and "b" of ECC blocks A and B.

The interleaving algorithm will now be described in more detail. First, object blocks "a" and "b" are divided along a column based on each line, respectively. Thus, object blocks "a" and "b" are divided into partitions of d×d, respectively. As a result, partitions of 2×d×d are created from object blocks "a" and "b." These partitions are 1_1, 1_2, ..., 1_2xd, 2_1, 2_2, ..., 2_2xd, ..., d_1, d_2, ..., d_2xd, each having data of $N_1/d$ bytes.

Next, data is extracted from the partitions in numerical order. In other words, first data is extracted from partition 1_1, second data is extracted from partition 1_2, ..., 2×d$^{th}$ data is extracted from partition 1_2xd, 2×d+1$^{st}$ data is extracted from partition 1_1, 2×d+2$^{nd}$ data is extracted from partition 1_2, ..., and 2×d+2×d$^{th}$ data is extracted from partition 1_2xd. In such order, data is extracted from all of 1_1, 1_2, ..., 1_2xd, and then data is alternatively extracted from 2_1, 2_2, ..., 2_2xd.

This process is repeated on each "d" line. A block created through this process is shown in FIG. 9.

Figure 9:
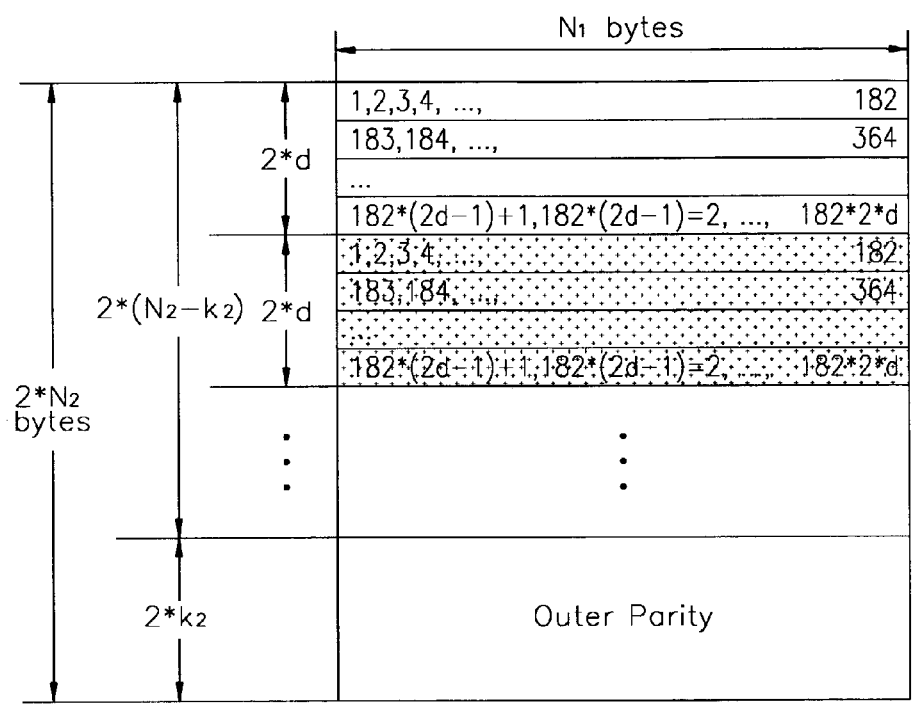

Referring to FIG. 9, it can be seen that the created block comprises data of 2×($N_2$−k2) and an outer parity of 2×k2, where k2 corresponds to the number of PO bytes in each of ECC blocks A and B. Figures recorded along the rows of the block represent consecutive numbers that are allotted to byte data of each partition. In other words, as described with reference to FIGS. 7 and 8, when the interleaving is performed, the byte data is arranged in the order shown in FIG. 9.

For example, a method of allocating consecutive numbers to object blocks "a" and "b" will be described. Since each partition of object blocks "a" and "b" has data of $N_1/d$ bytes, the following consecutive numbers are given to the partitions of object blocks "a" and "b."

Partition 1_1: When the remainder $N_1/d$ of 1, ..., 2×N1 divided by 2×d is 1.

Partition 1_2: When the remainder $N_1/d$ of 1, ..., 2×N1 divided by 2×d is 2.
. . .
Partition 1_2xd: When the remainder $N_1/d$ of 1, ..., 2×N1 divided by 2×d is 0.

Partition 2_1: When the remainder $N_1/d$ of 2×$N_1$+1, ..., 2×$N_1$+2×$N_1$ divided by 2×d is 1.

Partition 2_2: When the remainder $N_1/d$ of 2×$N_1$+1, ..., 2×$N_1$+2×$N_1$ divided by 2×d is 2.
. . .
Partition 2_2xd: When the remainder $N_1/d$ of 2×$N_1$+1, ..., 2×$N_1$+2×$N_1$ divided by 2×d is 0.
. . .
Partition d_1: When the remainder $N_1/d$ of (d−1)×2×$N_1$+1, ..., d×2×$N_1$ divided by 2×d is 1.

Partition d_2: When the remainder $N_1/d$ of (d−1)×2×$N_1$+1, ..., d×2×$N_1$ divided by 2×d is 2
. . .
Partition d_2xd: When the remainder $N_1/d$ of (d−1)×2×$N_1$+1, ..., d×2×$N_1$ divided by 2×d is 0.

This is generalized as follows.

Partition m_n: When the remainder $N_1/d$ of 2×$N_1$(m−1)+1, ..., 2×m×$N_1$ divided by 2×d is n.

Figure 10:
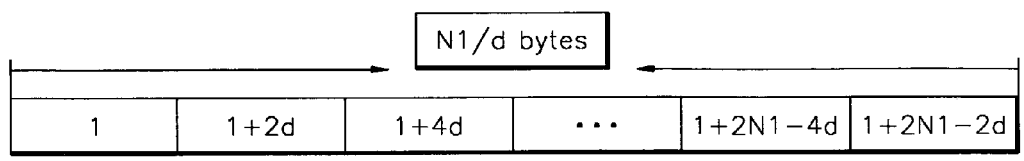

Referring to FIG. 10, for example, numbers 1, 1+2d, 1+4d, ..., 1+2N1−4d, 1+2N1−2d are sequentially given to data of N1/d bytes of partition 1_1. In other words, partition 1_1 has data of N1/d bytes, first byte of which is given 1, second byte of which is given 1+2d, third byte of which is given 1+4d, ..., (N1/d)−1$^{st}$ byte of which is given 1+2N1−4d, and N1/d$^{th}$ byte of which is given 1+2N1−2d.

Figure 11:
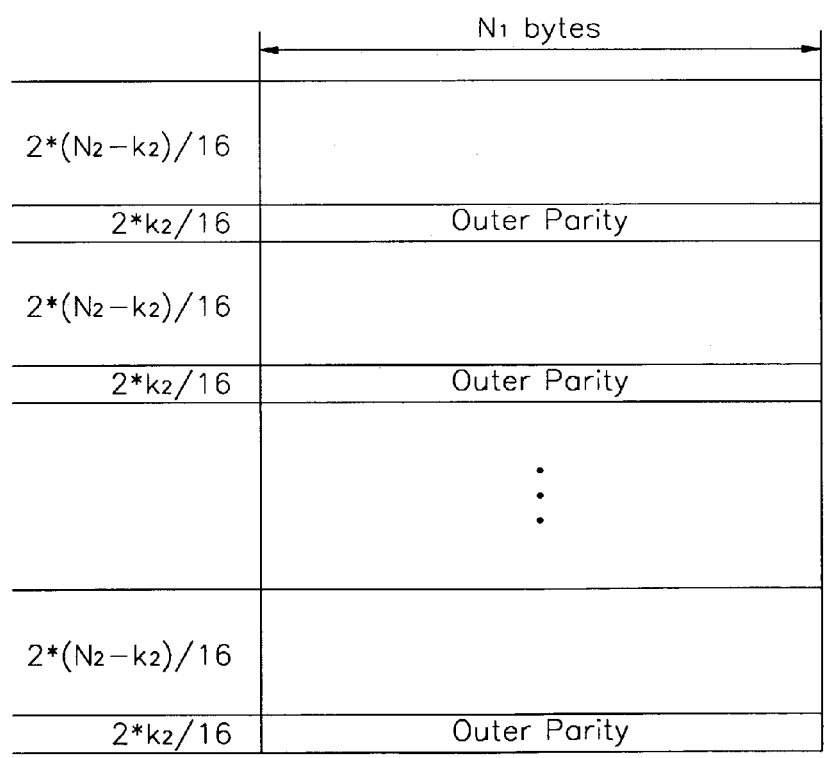

FIG. 11 schematically shows a recording block rearranged based on the block of FIG. 9. Referring to FIG. 11, the recording block is created by inserting PO of 2×k2, in the block of FIG. 9, at every 2×k2/16 lines.

Figure 12:
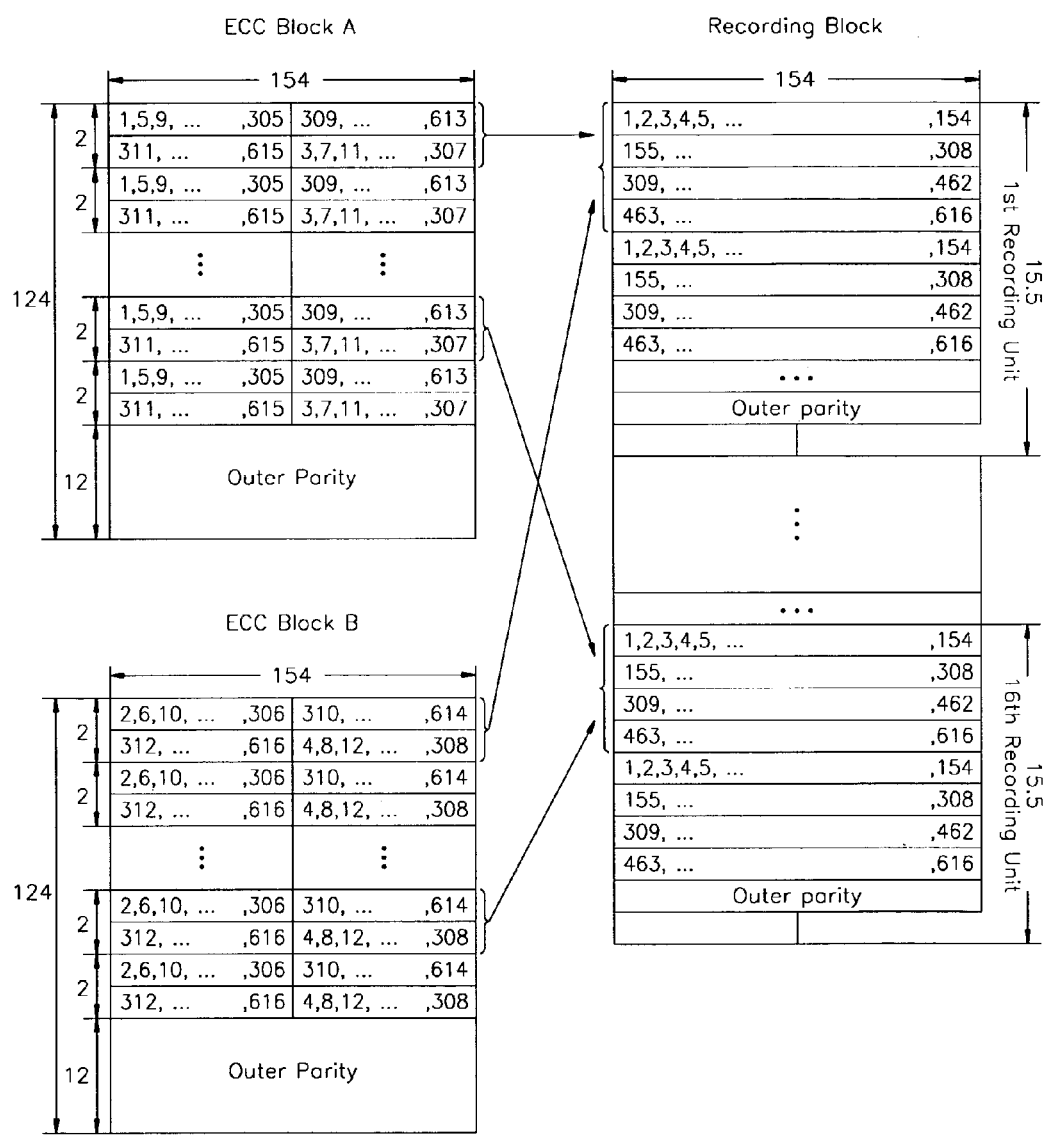
FIG. 12 is an illustration explaining an operation of creating a recording block by performing interleaving in the ECC blocks A and B of FIG. 6 according to an embodiment of the present invention.

FIG. 12 is a view for explaining a process of creating a recording block by performing interleaving in ECC blocks A and B. Referring to FIG. 12, when ECC blocks A and B are divided at every two lines, respectively, object blocks "a" and "b" have eight partitions (1), (2), (3), (4), (5), (6), (7), and (8), respectively. Object block "a" belongs to ECC block A and object block "b" belongs to ECC block B. Partition (1) has data 1, 5, 9, ..., 305, partition (2) has data of 309, ..., 613, partition (3) has data of 2, 6, 10, ..., 306. partition (4) has data of 310, ..., 614, partition (5) has data of 311, ..., 615, partition (6) has data of 3, 7, 11, ..., 307, partition (7) has data of 312, ..., 616, and partition (8) has data of 4, 8, 12, ..., 308.

To perform the interleaving, first data is extracted from partition (1), second data is extracted from partition (3), third data is extracted from partition (6), and fourth data is extracted from partition (8). Fifth data is extracted from partition (1), sixth data is extracted from partition (3), seventh data is extracted from partition (6), and eighth data is extracted from partition (8). After extracting all data from partitions (1), (3), (6), and (8), data is alternatively extracted from partitions (2), (4), (5), and (7). This process is repeated at every two lines. Since POs of ECC blocks A and B are 24 lines, respectively, POs of 1.5 lines are equally distributed to each recording unit. As a result, the recording block is created.

The recording block comprises 16 recording units. Each of the recording units has a size of 154×15.5 bytes.

Figure 13:
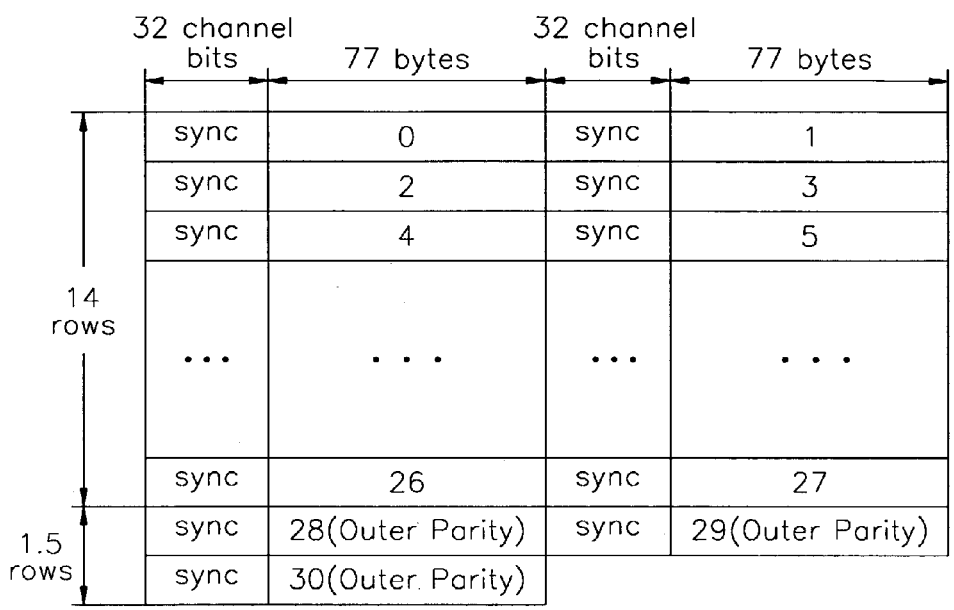
FIG. 13 is an illustration of a physical sector according to an embodiment of the present invention.

FIG. 13 shows the configuration of one physical sector. Referring to FIG. 13, one physical sector comprises data corresponding to one recording unit of FIG. 12. In this embodiment, each sync code comprises 32 channel bits according to a Dual coding method. When a sync code of 32 channel bits and data of 77 bytes form one sync frame, one sector data comprises 31 sync frames. Here, the number of channel bits being assigned to the sync codes and the sync code may vary.

Figure 14:
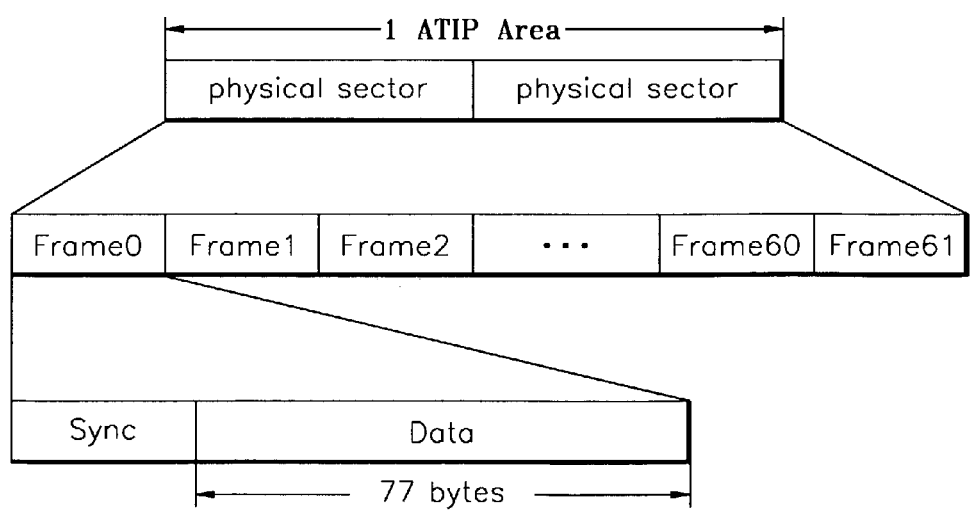
FIG. 14 is an illustration of a data structure of data recorded in an addressable unit area according to an embodiment of the present invention.

FIG. 14 shows the configuration of data that is recorded in an addressable unit area according to the present invention. Referring to FIG. 14, two physical sectors are recorded in one physical sector area that is one addressable unit area of the recordable compact disc. Each of the physical sectors comprises 31 sync frames. Each sync frame comprises a sync code of 32 channel bits and user data of 77 bytes.

A method of recording data according to the present invention will now be described based on the above-described structure.

Figure 15:
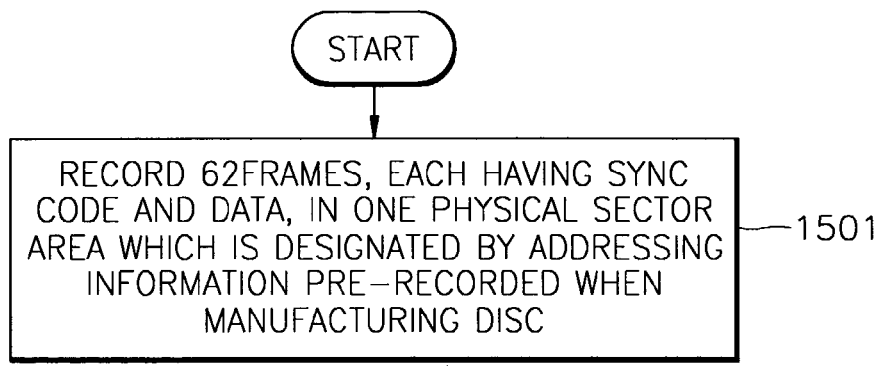
FIG. 15 is a flowchart explaining a recording of data according to an embodiment of the present invention.

FIG. 15 is a flowchart for explaining a method of recording data according to the present invention. Referring to FIG. 15, in step 1501, the recording apparatus records two physical sectors, i.e., 62 sync frames, each having a sync code of 32 channel bits and data of 77 bytes, in one physical sector area which is designated by addressing information pre-recorded when manufacturing the recordable compact disc.

Figure 16:
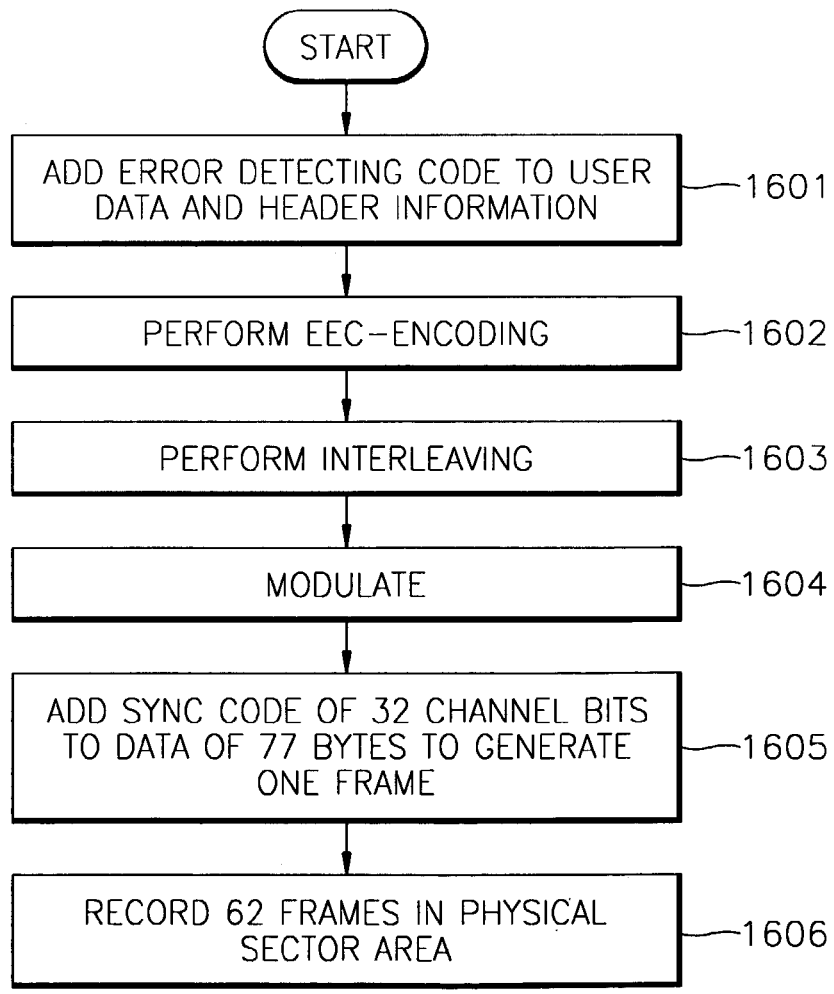
FIG. 16 is a flowchart explaining a recording of data according to another embodiment of the present invention.

FIG. 16 is a flowchart for explaining recording data according to the embodiment of the present invention. Referring to FIG. 16, in step 1601, the EDC adder 11 of the recording apparatus adds an EDC to user data of 2048 bytes and header information to generate one logic sector. In step 1602, the ECC encoder 12 generates an ECC block of 154×124 bytes to which PI of 6 bytes and PO of 12 rows are added by performing ECC-encoding using Reed-Solomon Product Code. In step 1603, the interleaver 13 performs interleaving in two ECC blocks to generate a recording block having 16 recording units. In step 1604, the modulating unit 32 modulates data of 1 byte to 15.3 channel bits according to the Dual modulation algorithm. In step 1605, the sync unit 33 adds a sync code of 32 channel bits to a channel bit stream according to the Dual modulation algorithm. In step 1606, the recording unit 34 records two physical sectors, i.e., 62 sync frames, in one physical sector area according to this embodiment of the present invention.

As described above, according to embodiments of the present invention, user data can be recorded on a recordable optical disc, particularly a recordable compact disc, at a higher density. In other words, 98 Eight-to-Fourteen Modulation (EFM) frames, i.e., data of 57624 channel bits (about 3390 bytes), are recorded in one ATIP sector of a conventional recordable compact disc to record user data of 2048 bytes. However, according to embodiments of the present invention, data which conventionally used to be stored in two physical sectors can now be recorded in one ATIP sector and data of 2449 bytes (a sync code of 32 channel bits (2 bytes)+header information of 20 bytes+user data of 2048 bytes+an EDC of 4 bytes) is recorded in each of the ATIP physical sectors. Thus, the recordable compact disc according to the present invention has a recording density 1.384 (3390/2449) times higher than the conventional recordable compact disc.

Further, in the prior art, data of 8 bytes is modulated to 17 channel bits according to the Dual modulation algorithm while in the present invention, data of 8 bytes can be modulated to 15.3 channel bits. Thus, recording density can increase by about 1.1 times.

When the minimum mark length (MML) is reduced from 0.833 µm to 0.627 µm, recording density can further increase by 1.33 times. Thus, if the Dual modulation algorithm is used with a reduction in the MML, 2.04 times higher recording density can be obtained. The reduction in the MML is possible within a guaranteeing reproduction quality limit. In addition, according to ECC blocks and the interleaving of the present invention, since the correction rate of burst errors may increase, reproduction quality should be guaranteed even with the MML being reduced to 0.627 µm.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on an optical recording medium having a plurality of addressable unit areas, the method comprising:
    recording 62 sync frames, each having a sync code and data, in each of the addressable unit areas.

2. A method of recording data on a compact disc having a plurality of physical sector areas, which are designated by addressing information pre-recorded during the manufacture of the compact disc, the method comprising:
    recording two physical sectors in each of the physical sector areas.

3. The method of claim 2, wherein the recording in the physical sector areas includes recording 62 sync frames, each having a sync code and data of 77 bytes, in each of the physical sector areas.

4. The method of claim 2, wherein further comprising:
    adding an error detecting code to user data and header information;
    performing error correction code-encoding to the user data and header information after the adding of the error detecting code;
    performing interleaving of the encoded user data and header information;
    performing channel-modulating on the interleaved encoding;
    adding a sync code to a channel bit stream corresponding to data of 77 bytes to generate one sync frame; and
    recording 62 sync frames in each of the physical sector areas.

5. The method of claim 4, wherein in the performing of error correction code-encoding, an error correction code block, for added main data of 148×112 bytes, Parity Inner of 6 bytes, and Parity Out of 12 rows, is generated using Reed-Solomon Product Code.

6. The method of claim 4, wherein the performing of interleaving further comprises:
    dividing two error correction code blocks of N1×N2 bytes into object blocks of "d" bytes that represent a greatest common divisor along a column of an object block, respectively;

dividing the object blocks of d×N1 bytes into d parts along a row and a column, respectively, to obtain partitions of d×d; and interleaving data in a predetermined obtained partition by alternatively selecting the two error correction code blocks to obtain a recording block having line-code words of 2×N2.

7. The method of claim 5, wherein in the performing of interleaving, a recording block having 16 recording units is generated.

8. The method of claim 7, wherein each recording unit has the size of 154×15.5 bytes and includes Parity Outs of 1.5 rows.

9. The method of claim 4, wherein in the performing of channel-modulation, data of 1 byte is modulated to 15.3 channel bits.

10. The method of claim 9, wherein the modulation to 15.3 channel bits is performed according to a Dual modulation algorithm.

11. An apparatus for recording data on a compact disc having a plurality of physical sector areas, which are designated by addressing information pre-recorded during manufacture of the compact disc, the apparatus comprising:

an encoding unit to encode user data and header information;

a modulating unit to modulate the encoded data to channel bits;

a sync unit to add a sync code to the modulated data; and a recording unit to record 62 sync frames, each having a sync code and data, in each physical sector area.

12. The apparatus of claim 11, wherein the encoding unit comprises:

an error detecting code adder to add an error detecting code to the user data and the header information;

an error correction code encoder to encode the user data and the header information to which the error detecting code is added, using Reed-Solomon Code, to generate an error correction code block; and an interleaver to interleave the generated error correction code block.

13. The apparatus of claim 12, wherein the error detecting code adder generates a logic sector of 148×14 bytes having user data of 2048 bytes, header information, and an error detecting code, and the error correction code encoder generates an error correction code block of 154×124 bytes, in which Parity Inner of 6 bytes and Parity Out of 12 rows are added to eight logic sectors, using Reed-Solomon Product Code.

14. The apparatus of claim 13, wherein the interleaver divides first and second error correction code blocks into two parts along rows of the first and second error correction code blocks and divides two rows along a column of the first and second error correction code blocks, respectively, to form 56 object blocks each including four partitions, and interleaves data so that partitions of object blocks belonging to the first error correction code block and partitions of the object blocks belonging to the second error correction code block are alternatively selected to generate a recording block.

15. The apparatus of claim 12, wherein the interleaver generates a recording block in which data of 1 through 616 is sequentially arranged and which has 16 recording units of 154×15.5 bytes to which Parity Outs of 1.5 rows is added, where partition (1) includes data 1, 5, 9, . . . , 305, partition (2) includes data of 309, . . . , 613, partition (3) includes data of 2, 6, 10, . . . , 306, partition (4) includes data of 310, . . . , 614, partition (5) includes data of 311, . . . , 615, partition (6) includes data of 3, 7, 11, . . . , 307, partition (7) includes data of 312, . . . , 616, and partition (8) includes data of 4, 8, 12, . . . , 308.

16. The apparatus of claim 11, wherein the sync unit generates one physical sector which includes 31 sync frames, each having a channel bit stream corresponding to data of 77 bytes and a sync code of 32 channel bits.

17. A medium having a plurality of addressable areas, the medium comprising user data recorded by recording precisely 62 sync frames, each having a sync code and data, in each of the addressable unit areas.

18. A medium having a plurality of physical sector areas, the medium comprising user data recorded by recording two physical sectors in each of the physical sector areas.

19. A medium having a plurality of physical sector areas, the medium comprising user data recorded by adding an error detecting code to user data and header information, performing error correction code-encoding, performing interleaving, performing channel-modulating, adding a sync code to a channel bit stream corresponding to data of 77 bytes to generate one sync frame, and recording 62 sync frames in each of the physical sector areas.

20. The medium of claim 19, wherein the performing of interleaving further comprises dividing two error correction code blocks of N1×N2 bytes into object blocks of "d" bytes that represent a greatest common divisor along a column of an object block, respectively, dividing the object blocks of d×N1 bytes into d parts along a row and a column, respectively, to obtain partitions of d×d, and interleaving data in a predetermined obtained partition by alternatively selecting the two error correction code blocks to obtain a recording block having line-code words of 2×N2.

* * * * *